United States Patent [19]

McCormick

[11] 4,141,673

[45] Feb. 27, 1979

[54] ENGINE DAMPENER MEANS

[76] Inventor: Eugene C. McCormick, P.O. Box 706, Wellington, Kans. 67152

[21] Appl. No.: 752,471

[22] Filed: Dec. 20, 1976

Related U.S. Application Data

[60] Continuation of Ser. No. 578,402, May 19, 1975, Pat. No. 4,007,773, which is a division of Ser. No. 469,427, May 13, 1974, Pat. No. 3,926,156.

[51] Int. Cl.[2] .............................................. B64C 11/38

[52] U.S. Cl. ................................ 416/170 R; 416/500; 416/157 R

[58] Field of Search ......................... 416/170, 156, 500

[56] References Cited

U.S. PATENT DOCUMENTS

| | | | |
|---|---|---|---|
| 1,802,024 | 4/1931 | Kreis | 123/52 M |
| 1,840,220 | 1/1932 | Brener | 123/52 M X |
| 1,987,650 | 1/1935 | Wiegand | 416/156 X |
| 1,990,814 | 2/1935 | Castro | 416/156 X |
| 2,202,813 | 6/1940 | Gausmann | 416/156 |
| 2,284,473 | 5/1942 | Menasco et al. | 416/170 X |
| 2,431,184 | 11/1947 | Martin | 416/224 |
| 2,583,172 | 1/1952 | Haines | 416/156 X |
| 2,641,024 | 6/1953 | Panagrossi | 123/41.69 |
| 2,705,479 | 4/1955 | Wiseman | 123/56 AA |
| 2,771,277 | 11/1956 | Cross | 123/41.69 |

*Primary Examiner*—Everette A. Powell, Jr.

*Attorney, Agent, or Firm*—John H. Widdowson

[57] ABSTRACT

A vibration dampening means and method for substantially reducing the vibrational frequency of a multi-cylinder air-cooled airplane engine. The engine driving a hydraulic governor pump for a propeller servo. The servo controlling the blades of a variable pitch propeller. The dampening means including a resilient member mounted on the cooling fins of the cylinders, a hydraulic dampener connected with the hydraulic governor pump, and resilient dampeners mounted on the propeller blades.

3 Claims, 7 Drawing Figures

ENGINE DAMPENER MEANS

This is a continuation of application Ser. No. 578,402, filed May 19, 1975, now U.S. Pat. No. 4,007,773, and said application Ser. No. 578,402 was a division of application Ser. No. 469,427, filed May 13, 1974, now U.S. Pat. No. 3,926,156.

BACKGROUND OF THE INVENTION

The invention is generally related to dampeners for reciprocating air-cooled engines and the method of applying the dampener to the engine. The invention is specifically related to resilient cooling fin dampeners for aircraft engines and modifications of the intake manifold and propeller servo control system for the purpose of reducing the forced vibrational frequency of the engine to prevent damage to the engine by self-induced vibrations.

In general, aircraft engines are prone to have vibration problems, as they must be light in weight and have a relatively high horsepower, as well as being air-cooled. The problems of vibration are particularly acute in reciprocating type air-cooled aircraft engines, due to the reciprocating firing motion of the engine. In the prior art, little has been done to prevent or overcome excessive vibration problems in reciprocating air-cooled aircraft engines, except by way of strengthening the damage-prone parts of the engine and spreading the operational frequency of the engine by operating engine-driven pumps, and other accessories, at speeds which are fractionally proportionally different from the crankshaft speed or firing or the frequency of the engine. In strengthening of the engine structure to prevent damage fin dampeners have been constructed to be mounted between and on the end portion of the cooling fins, primarily to prevent the fin from being broken off. The prior art fin dampener and strengthening structures have a single strip of resilient material, specifically rubber, which is pressed into the outer portion of the cooling fins and is attached to the fins by the heat of the engine which cures or sets the material. Other known fin dampener structures include a comb-like structure, having the teeth extending between the fins with a clasp encircling the teeth and rightenable to compress them circumferentially thus expanding it between the fins to hold it in place. A prior art fin dampener structure is known which extends from the outer portion of the fins completely to the attachment point of the fins with such being retained in place by an adhesive material. No prior art device or devices are known which are specifically constructed for use with an air-cooled multi-cylinder aircraft type engine to control the vibrational characteristics or natural operating frequency of the engine in an attempt to prevent the operating frequency from becoming resonant or causing substantial structural damage to the engine.

Reciprocating type internal combustion aircraft engines are inherently a vibration generating body in an aircraft due to the inherent reciprocating or oscillating motion. Reciprocating type aircraft engines are balanced internally so they will perform their operation with a minimum of unbalance: however, in practice the engines do vibrate considerably and produce a quantity of often objectionable noise. Engine vibration and noise affect engine fatigue, airframe fatigue and pilot fatigue. A great many engine failures and pilot failures or malfunctions can be attributed to engine vibration and noise associated with the operating the reciprocating type of engine. The specific engine failures or malfunctions which can be substantially attributed to vibrationally induced factors include, cooling fin fractures, engine cylinder fractures, piston ring fractures, and crankshaft and connecting rod fractures. It is well known in the art that fatigue, due to noise and vibration, will crack and propagate cracks in materials subjected to such forces, and it is these forces which cause fracture or other failure in the identified parts of an engine or other parts of an engine connected with these components.

The problem of engine failure and malfunction has long been a critical problem in aviation and it has been studied in depth. One such study was conducted by the United States National Transportation Safety Board and documented in the report entitled, "Special Study Accidents Involving Engine Failure/Malfunction, U.S. General Aviation, 1965–1969." This report is published by the National Transportation Safety Board as report number NTSB-AAS-72-10, it was adopted Nov. 29, 1972. This special study presents a record of engine failure/malfunction accidents for fixed-wing aircraft, all of which occurred in all operations of U.S. general aviation, during the period of 1965–1969. It includes a complete comparison of engine-failure accident rates for single-engine and multi-engine aircraft. Analysis are included concerning causes and related factors of engine-failure accidents by selected makes and models of aircraft and engines. It includes tables, comparing cause/factors for the accidents and severity of the accidents for all fixed-wing aircraft along with single-engine and multi-engine fixed-wing aircraft.

The invention disclosed herein is a result of studies of and experiments made with a Continental IO-470 and IO-520 series engines. The IO-470 and IO-520 series of engines are manufactured in several models for different applications however they are basically structurally the same. These engines are essentially structurally identical with the IO-520 series having a larger displacement and horsepower rating. The following are exerpts from the identified report, from the portion related to analysis of engine failure/malfunction for these particular engines. A close examination of the special study report indicates that these identified engines had a significantly higher-than-expected involvement in individual power plant cause/factor citations. It is to be noted that the power plant of an aircraft was cited as a probable cause/related factor in over 44 percent of the engine-failure accidents. The predominant power plant cause/factor citation include in part; master and connecting rods, cylinder assembly, piston and piston rings, and crankshaft. In regard to the IO-470 model engine, the cause/factor citations were specific to the engine cylinder assemblies, master and connecting rods, crankshaft, fuel system lines and fittings. In regard to the Continental IO-520 engine, the cause/factor citations were specific to the piston, piston rings and crankshaft. The specific engine elements cited are the elements of the engine which would obviously be the most likely to have vibration and fatigue damage because they are so closely related to the rotating and reciprocating motion of the engine. In use, the two identified engines are normally used in the following aircraft: Beechcraft Model 35; Cessna 180; Cessna 182, Cessna 206, Cessna 188, and Navion Model L-17. In the special study report, detailed cause/factors for particular aircraft make and model are compared with those of other aircraft. In this comparison a normal approximation the nomial technique was used, wherein the accounts of a cause/factor for a particular assembly, engine, aircraft, etc., is comparable to same appearance for all aircraft involved in the study. The special study report reveals that most of the engine-failure accidents for each aircraft make and model were caused by a pilot-in-command error, such as inadequate preflight preparation and/or planning, mismanagement of fuel, and improper operation of power plant controls. Explaining why a particular aircraft has a higher than expected percentage of engine failure accidents for a specific power plant cause/factor involves an inspection of the engines installed in those particular aircrart. In regard to the identified engine, the frequency of piston and piston ring problems are significantly higher than expected for the Navion L-17 and the Cessna 210 than in the Beechcraft. The Navion L-17 uses the Continental IO-470 model engine and the Cessna 210 is equipped with the Continental IO-470 and the Continental IO-520 engine. The IO-470 engine in the Beechcraft Model 35 aircraft experienced a higher than expected involvement in the fuel system pumps area. In regard to the Cessna 210 aircraft, the following engine elements and percentages are the parts of the engine structure which were cited as a cause/factor in the respective percent of total accidents: piston, piston rings-6.9%, cylinder assembly-5.2%, crankshaft-3.4%, and master and connecting rods-3.4%. The expected percentage of engine structure failure or malfunction for the noted elements is 2%, 2%, 1.8%, and 2.5%, respectively. It is to be noted that the actual percentages are significantly higher than the actual percentages in this instance substantially higher than the expected percentages.

In the special study, a total of 3,312 engine-failure accidents were condiered. The accidents studied do not include home-built or experimental category of aircraft. The pilot was the cause/factor in the majority (64.31%) of the accidents and the power plant was a cause/factor in 38.82% of the accidents. Summerizing these comparisons of power plant cause/factors, some of them appeared to be significantly higher than expected in percentage of involvement to be vibration induced or caused. These two identified engines, according to reports, appear to be more seriously affected by vibrations of normal engine operation than do the other engines of the group studied. No prior art device is known which is operative to reduce the vibrational characteristics of a reciprocating type aircraft engine, particularly the identified engines so the vibrational response of the engine is effectively lowered to prevent damage and failures of the type outlined in the report on the special study.

SUMMARY OF THE INVENTION

In a specific embodiment, the engine dampener structure includes dampener apparatus for the engine cylinders and dampeners for the propeller and propeller pitch control system dampener for a reciprocating internal combustion type air-cooled aircraft engine. The engine dampener structure functions to reduce the normal operating frequency of the engine which will prevent portions of the engine from vibrating at or near their resonant frequency, thereby improving the safety of operation and the normal usable life of the engine. The dampener structure specifically includes a cooling fin vibration dampener mountable with the outer portions of the engine cylinder's cooling fins, the addition of a fluid pulsation dampener to the governor pump used for powering the servo of a variable pitch propeller, a dampener for the blades of the peopeller and a tuned intake manifold structure for the engine. The cooling fin dampener has a resilient member with portions mountable in a compressed condition between outer portions of the cooling fins. The propeller governor pump modification includes the addition of a hydraulic accumulator as a fluid pulsation dampener in the line connecting the pump and the propeller servo. The dampener for the propeller has resilient dampening members attached to inner portions of the propeller blades. The tuned intake manifold is tuned to provide an essentially uniform normal operating manifold pressure distribution among the multi-cylinders of the engine.

One object of this invention is to provide an engine dampening structure overcoming the aforementioned disadvantages of the prior art devices.

One object of this invention is to provide an engine dampening structure which will reduce the normal operating vibrational frequency or natural operating frequency of a multi-cylinder air-cooled aircraft type engine to prevent portions of the engine from being forced to vibrate at or near a resonant frequency or a harmonic of a resonant frequency.

Still one other object of this invention is to provide an engine dampener structure having a cooling fin vibration dampener mountable with the cooling fins of the cylinder of an air-cooled engine to reduce the vibrational frequency to which the fins; and the piston and cylinder assembly can be forced by normal operation of the engine.

Yet, another object of this invention is to provide an engine dampener structure having a dampened propeller assembly including a resiliently dampened propeller and a fluid pulsation dampened governor pump and propeller pitch control servo system to reduce vibrations.

Another object of this invention is to provide an engine dampener structure including a tuned intake manifold functioning to provide an essentially uniform normal operating manifold pressure distribution for the multi-cylinders of an aircraft type engine, wherein it gives a uniform cylinder temperature distribution and allows the engine to operate to produce essentially equal power, from each cylinder thereof.

Various other objects, advantages and features of the invention will become apparent to those skilled in the art from the following discussion, taken in conjunction with the accompanying drawing, in which:

Figure 1:
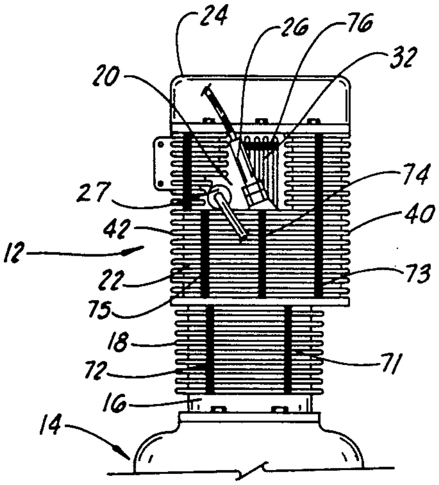
FIG. 1 is a top plan view of a cylinder portion of an air-cooled aircraft type engine having fin dampeners in place on the cooling fins there of, with the cylinder being shown mounted on a portion of the engine crankcase.

The following is a discussion and description of the preferred specific embodiments of the engine dampener structure and method of this invention, such being made with reference to the drawings, whereupon the same reference numerals are used to indicate the same or similar parts and/or structure. It is to be understood that such discussion and description is not to unduly limit the scope of the invention.

DESCRIPTION OF PREFERRED EMBODIMENT

The engine dampener means of this invention includes several elements which operate as a system to dampen the vibration of an air-cooled reciprocating internal combustion aircraft type engine. The general function of the dampening means is to reduce the natural normal operating frequency of the engine to prevent it from reaching an essentially resonant frequency. This type of engine has several vibrating elements which are coupled by the structure of the engine and vibrate as a complete system when the engine is in normal operation. The dampening means of this invention includes several elements which operate to reduce the coupling effect of the several vibrating elements of the engine and generally function to dampen the vibration of the engine. An element of a cylinder dampener structure includes a cooling fin and dampener mountable with the cooling fins of the engine. Another element is the cylinder dampener includes a tuned intake manifold. Another element is the propeller system dampener including a variable pitch propeller servo pump which is dampened, and of a propeller dampener with resilient members mountable onto blades of the propeller.

Figure 2:
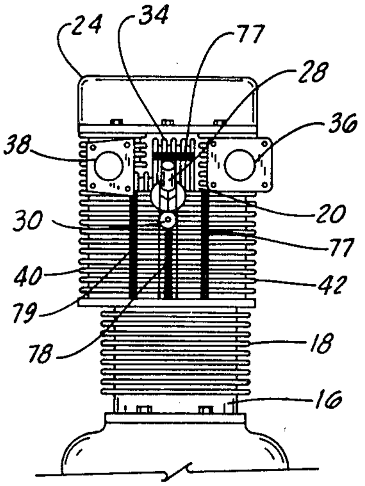
FIG. 2 is a bottom plan view of the cylinder shown in FIG. 1 with the fin dampeners in place thereon.

A study of the engine cylinder cooling fins reveals the fins to be easily excitable vibratable members. The cylinders of the subject type of aircraft engine generally have radially-disposed cooling fins extending from the cylinder structure between what is the compression chamber portion of the cylinder and the portion of the cylinder mounted with the engine crankcase. FIGS. 1 and 2 show top and bottom views respectively of such a cylinder. The compression chamber portion of the cylinder also has generally radially-disposed cooling fins extending therefrom with outwardly extending cooling fins on the end thereof. The force which normally excites the cooling fins during the operation of the engine is the combustion explosion in the cylinder. The frequency in which the cooling fins are excited depends upon the speed of the engine, the number of cylinders the engine has, and the frequency at which the fins of a particular cylinder are excited relative to the frequency of other portions of the engine depend upon the number of cylinders on a particular engine.

In the development of this invention, the two above-identified Continental make of engines were studied and the dampening means of this invention was developed specifically for those engines; however, it is to be understood that the general characteristics of this engine are similar to other similarly constructed engines, and the dampening means of this invention can be used with other similarly constructed engines. These identified engines have six (6) cylinders, three (3) on each side, in an opposed relation with the crankshaft being in the center. The engines studied were equipped with variable pitch propellers and a normally aspirated fuel injection system. FIGS. 1 and 2 show top and bottom views of one cylinder for such an engine attached to a portion of the crankcase. The combustion chamber intake and outlet ports are on what is normally the bottom side of the engine. The cylinder 12 is bolted to the crankcase 14 in a rigid position, by bolts extending through the flange on the cylinder barrel 16. A plurality of cooling fins 18 extend from the cylinder barrel portion 16 in a regular spaced relation as shown. The outer end portion 12 is a combustion chamber portion thereof, indicated at 20, and it has a plurality of cooling fins 22 extending radially therefrom as shown. A valve assembly rocker arm cover 24 is attached to the outer end of the cylinder 12. Spark plugs 26 and 28 are mounted in the combustion chamber portion of the cylinder on the top and bottom sides thereof respectively. The fuel injector 27 is adjacent to the spark plug 26. A cylinder head temperature gauge probe 30 is mounted in the lower side of the cylinder 12 adjacent to the spark plug. A plurality of longitudinally disposed cooling vanes, 32 and 34, extend from the spark plug portion of the combustion chamber portion of the cylinder to its outer end portion as shown on the upper and lower sides of the cylinder respectively. On the lower side of the cylinder 12, the intake port 36 is located on the opposite side of the cylinder relative to the exhaust port indicated at 38. The longitudinally disposed cooling fins 34 extend essentially between the intake port 36 and the outlet port 38. The structure of the cylinders for the IO-470 series engines and the IO-520 series engines is essentially the same with the cylinder barrel portion 16 and combustion chamber portion 20 being constructed separate pieces of material and the separate portions being permanently joined. The natural frequencies of the cooling fins on the cylinders for these two series of engines is essentially the same, although the cylinders differ slightly in bore diameter. Additionally, the cylinders for the two series of engines are constructed in an original version and a heavy version; the heavy version has slightly thicker cylinder walls; however, the cooling fins thereof having essentially the same natural frequencies. The heavier version of the cylinders is now required on U.S. Registered aircraft as per Federal Aviation Administration Airworthiness Directive Revision 72-20-2. In studying the cylinders of the IO-470 engine in the lightweight version, the cooling fins indicated at 40 on the exhause side of the cylinder are found to have a fundamental frequency of approximately 880 cycles per second, (cps), with second, third, fourth, and fifth harmonics at 1760 cps, 2640 cps, 3520 cps, and 7040 cps. On the intake side of the cylinder, the cooling fins indicated at 42 are found to have a fundamental frequency of approximately 1320 cps, with a second harmonic at 2640 cps. At this point, it is to be noted that the complete cylinder apparently exhibits characteristics of having a fundamental natural frequency of 440 cps, because the observed vibratable frequencies of the cooling fins on the cylinder range between the second and the sixteenth harmonic of that fundamental frequency. In practice, the vibrating features of the cooling fins were determined using an electronic piano tuner. The piston rings of a piston assembly for the IO-470 series engine have been studied using a sound generator to induce vibration. In studying the compression rings, they were found to exhibit the 6-node vibrating node at 440 cps, the rings fundamental frequency, and harmonics 1–13 upward therefrom. A maximum amptitude was observed at 880 cps with a significant amptitude at 440 cps and 1760 cps, the first and fourth harmonics respectively. The oil ring is observed to have a fundamental frequency of approximately 440 cycles per second. When the compression rings are placed in a cylinder without a piston and the cylinder is vibrated the rings will vibrate in the 6-node pattern and crawl or move in the cylinder bore in the direction of the combustion chamber end portion of the cylinder. The piston rings were studied at room temperature, and temperatures up to 250° F., with a small reduction in natural frequency vibration noted at the elevated temperature. At this point, it is to be noted that the piston rings of a piston assembly for the identified series of engines apparently exhibits the same harmonic frequencies as the cylinders for the engines as described supra.

In the general structure of an aircraft engine, the internal bore of the cylinders thereof are tapered with the barrel portion of the cylinder being larger than the compression end portion of the cylinder, so that adequate compression is maintained in the cylinder as it is heated during engine operation. When the cylinder of such an engine is heated, the combustion chamber portion thereof is obviously heated significantly more than the barrel portion thereof, due to the combustion process, and expanded significantly. The tapering of the cylinder bore of the cylinder is referred to as "choking." In studying the cylinders of the IO-470 series engines, the choked condition of the cylinder bore is found to be essentially relieved at approximately 250° F. It is to be noted that until the cylinder has reached approximately 250° F., in operation of the engine of the cylinder operates in a choked condition wherein the clearance between the piston and the cylinder wall is significantly less than would be encountered in normal operation. In studying operation of the IO-470 series engine, it has been found that the two cylinders on the forward end of the engine or the end thereof which mounts the propeller and is normally forward when mounted on an airplane will operate at approximately 100° F. below the normal operating temperature of the rearmost pair of cylinders. In examination of several IO-470 series engines when dismantled after being run a substantial length of time indicates that the relatively cool temperature of the forward cylinders prevents the piston rings from properly seating in the piston cylinder bores, and in some cases, causes scoring of the piston and the cylinder bore. It is to be noted that when a piston has moved in the choked cylinder, it requires substantially more force to move the piston than when it is moved in a heated and unchoked cylinder because the compression rings move in a substantially cylindrical bore rather than a tapered bore as when the cylinder is in the choked condition.

Figure 6:
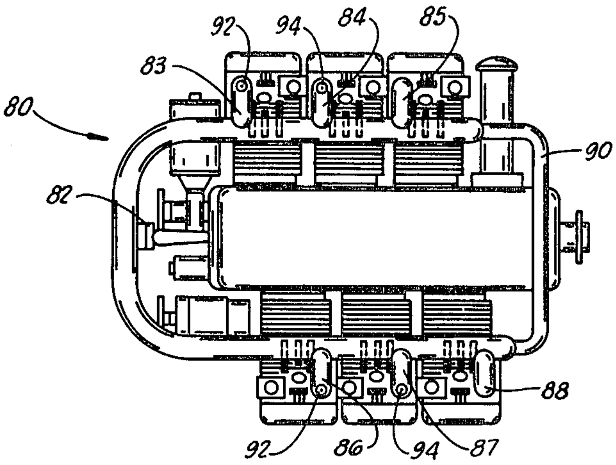
FIG. 6 is a plan view of the bottom side of an opposed cylinder, aircraft engine, the engine having the fin dampeners and the tuned intake manifold of this invention.

The cylinders on the identified series of engines are mounted on the crankcase in a staggered and opposed relation as shown in FIG. 6 so the connecting rods properly line up with the appropriate throws on the crankshaft. The cylinders are numbered from the rear of the engine to the front or output end of the engine with cylinder #1 being the rearmost cylinder on one side of the crankcase, and cylinder #2 being on the opposite side thereof with the piston rods thereof mounted on the same crankshaft throw. Cylinders 1, 3, and 5, are on one side of the crankcase, and cylinders 2, 4, and 6 are on the opposite side of the crankcase specifically the left and right respectively as shown in FIG. 6. The firing order of these series of engines is by cylinder number as follows: 1-6-3-2-5-4. It is to be noted that in observing the firing order of the cylinders that combustion on cylinder #1 at the rear of the engine immediately precedes firing on cylinder #6 at the forwardmost end and the opposite side of the engine, and in this order of firing, the cylinder which normally operates in an unchoked condition is fired immediately preceding a cylinder which normally will operate in a choked condition.

In normal operation of the identified series of engines, the intake manifold portion thereof operates with pressure the atmospheric pressure. In these series of engines, the differential pressure between the forward portion of the intake manifold which is connected with the forwardmost cylinders and the rear portion of the intake manifold, which is connected with the rearmost cylinders, indicates there is a differential pressure between these two points, which will in normal operation of the engine vary from approximately 3 inches of mercury to approximately 4.5 inches of mercury. The horsepower output of an internal combustion engine is in part dependent upon the intake manifold pressure for a particular engine speed. Examination of maximum power data for altitude performance of the IO-470 series engines indicates that for an engine speed of approximately 2,600 rpm, a differential pressure of 4.5 inches of mercury has a differential power of approximately 51 horsepower or on a per cylinder basis, approximately 8.5 horsepower per cylinder. In view of this, it is obvious that the forward cylinders of the engine are producing less horsepower than the rear cylinders of the engine because the intake manifold pressure at the rear of the engine is is higher that it is at the forward portion of the engine. A study of constant speed operation of this engine revealed the described intake manifold pressure distribution; however, rapid opening and closing of the engine throttle drastically changes the manifold pressure distribution.

Figure 3:
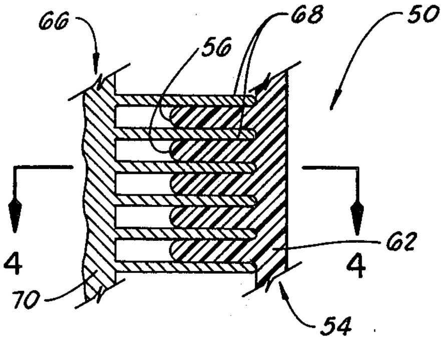
FIG. 3 is a cross-sectional elevation view of a finned segment of a cylinder having a segment of the fin dampener mounted therewith.
Figure 5:
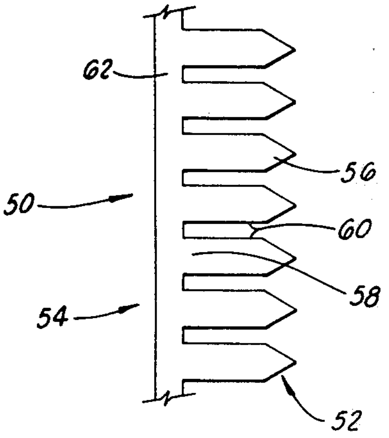
FIG. 5 is an enlarged side elevation view of a segment of the cooling fin dampener.
Figure 4:
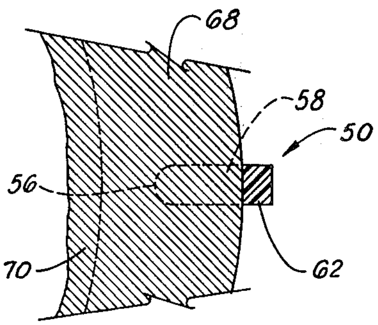
FIG. 4 is a sectional view of the finned segment and cooling fin dampener taken on line 4—4 of FIG. 3.

FIGS. 3–5 show in detail the structure of the cooling fin dampener alone and mounted with a finned segment of a cylinder. The cooling fin dampener is preferably a cross-sectionally comb-like structure, indicated generally at 50, having a first portion 52 mountable between adjacent fins on a finned segment, and an integral second portion 54 connecting the ends of the first portion 52. The cooling fin dampener 50 is preferably constructed of a resilient material in a strip-like segment with the teeth or lug-like portions of the first portion 52 appropriately spaced to be inserted between the adjacent cooling fins. The first portion 52 has a plurality of teeth or lug-like members with each having a reduced size outer end portion 56, and each having a mounted end portion 58. The lug-like portions are tapered and preferably pointed on their outer end portion as shown in FIG. 5 when in an uncompressed state and they assume an essentially rounded shape as shown in FIGS. 3 and 4 when mounted. The lug-like portions have essentially parallel adjacent edges 60 between the outer end portions 56 and the mounted or inner end portions thereof 58. The fin dampeners second portion 54 is an elongated relatively narrow strip integrally formed with the fin dampeners first portion 52 at the mounted portions 58 with the teeth-like portions of the second portion 52. The second portion 54 traverses the mounted end 58 of the teeth or lug-like members of the first portion 52. FIG. 3 shows a finned segment indicated generally at 66 with the cooling fin dampener 50 mounted thereon. The finned segment 66 illustrates the cylinder of an engine which has a plurality of cooling fins 68, extending therefrom. The cooling fins 68 are essentially parallel to each other and generally perpendicular to the cylinder wall support segment 70. FIG. 4 shows the finned segment 66 and dampener 50 in section taken through one of the cooling fins with portions of the cooling finned segment and the dampener shown in dashed lines. The dampener 50 is mounted with the teeth-like portions thereof between adjacent cooling fins 68 and the second portion 62 thereof closely adjacent to or in contact with the outer peripheral edge of the cooling fins. The dampener 50 has the teeth thereof extending in to the outer peripheral portion of the cooling fins. The lug-like portions of the dampener's first portion 52 are preferably constructed having a thickness or width greater than the gap or distance between the cooling fins so when they are mounted they are retained solely by friction between the cooling fins in a compressed condition.

In installing the cooling fin dampener 50 of this invention, a pair of adjacent cooling fins are separated by inserting a wedge-like member between same, then a tooth or lug-like portion of the dampener member is inserted between the fins in a desired position, then the wedge-like member is removed, releasing the cooling fins to contact and compressibly retain the tooth-like member there between. Once a tooth of a fin dampener strip member has been inserted, the process is repeated on the next tooth, then the next, until the strip is mounted in the cooling fin in the position as shown in FIG. 3. A lubricant can be used to aid in inserting the teeth between the cooling fins. In practice a liquid detergent, such as a household dishwashing detergent, has been successfully used to assist in placing the teeth-like portions of the fin dampener 50 in a cooling fin.

In using the fin dampener 50 with the identified series of engines, the first portion 52 of the dampener is constructed with the teeth-like portion thereof spaced to correspond with the cooling fin spacing of the engine. The cooling fins on the identified series of engines are approximately 0.05 inches in thickness, and 0.1 inches in spacing. Preferably, the fin dampener has the teeth or lug-like portions thereof constructed being 0.15 inches in thickness and 0.05 inches in spacing and approximately 0.25 inches in width. In practice, fin dampeners constructed as described have been used with cooling fins in the identified engine and operated for a substantial length of time without failure of the fin dampeners or a substantial loss in resiliency. Preferably, the fin dampener 50 is constructed of a neoprene composition material, because of its oil and hydrocarbon resisting properties. The fin dampener 50 is preferably constructed by molding the neoprene composition material with the teeth or lug-like portions sized and spaced so they will fit the cooling fins of an engine in the described manner. It is obvious the resilient material of the fin dampener can be constructed of materials other than a neoprene composition material, for example, synthetic rubber, or a silicon composition material or any other suitable resilient material can be used.

Another portion of the dampening means of this invention is related to a cylinder dampener in the form of a tuned intake manifold for the engine. In regard to the tuned intake manifold, its function is to cause the engine to operate with a uniform or substantially even normal operating manifold pressure. As described above, in the normal operation of the identified series of engines, the cylinders operate at a non uniform temperature with the forwardmost cylinders being the colder, and the rearmost cylinders being the hotter. For the IO-470 series engines, the temperature distribution between the forwardmost cylinders and the rearmost cylinders is approximately 100° F. Normally, the cylinder head temperature of an aircraft engine is monitored by a cylinder head temperature gauge probe by a cylinder head temperature gauge on one of the center cylinders. It is recommended by aircraft manufacturers that in normal operation of an aircraft it not be flown until the engine has reached the normal operating temperature. However, it is to be observed that when the engine has reached this temperature, the forward cylinders of the engine are still below the normal operating temperature so they are operating in the choked condition, as described above.

FIG. 6 shows a plan view of the underneath side of the engine, clearly exposing intake manifold. The intake manifold for the engine is indicated generally at 80 and includes a looped conduit structure having an inlet and connected with the intake ports on the engine's cylinders. The conduit inlets are indicated at 82 at the rear of the engine. On the right side of FIG. 6, the conduit outlets are indicated at 83, 84 and 85 which serve the cylinders #1, #3, and #5, respectively. On the left side of FIG. 6, the conduit outlets are indicated at 86, 87, and 88, and they serve cylinders #2, #4, and #6, respectively. A flow-balancing conduit 90 is communicably connected between the conduit segments of the intake manifold 80 for balancing the flow through the manifold. As described above, normal operation of the engine results in a pressure distribution through the intake manifold having a differential pressure or approximately 4.5 inches of mercury between the outlets 83 and 86, on the rear of the engine and the outlets 85 and 88 on the forward of the engine. In practice, the pressure distribution between the several outlets of the intake manifold 80 have been made essentially uniform by reducing the internal cross-sectional area of the outlet segments of the intake manifold, this causes the engine to operate with essentially intake manifold pressure and essentially the same cylinder head temperature on all cylinders. In practice, it has been found practical to crimp the intake manifold to reduce the cross sectional area. The manifold's crimped sections are indicated at 92 and 94 in FIG. 6. In practice, the intake manifold conduit segments adjacent to the outlets 83, 84, 86, and 87, have been crimped by selectively placing a dent in an easily accessible portion of the manifold at a point closely adjacent to the outlet end of the conduit segments. In crimping the conduits, the specific amount of the crimp or dent determines the amount of reduction in cross sectional area this reduction is specifically dependent upon the distance between the outlet segments and the change in pressure differential which must be accomplished. In practice, it has been found that the rearmost conduits having crimps 92 must have a cross sectional area slightly less than the center conduits having crimps 94, because they are nearer to the intake manifold inlet 82. In the intake manifolds for the above-identified series of engines, they are constructed of a lightweight material which is easily bent, and in practice it has been crimped by using a blunt object to force a dimple in the conduit segments thereof in a curved outlet end portion closely adjacent to the outlets of the intake manifold. In practice on the IO-470 series engine, it has been operated with the intake manifold thereof modified as described, and will operate normally with the cylinder head temperature for all the cylinders in the range are 350–380. The actual normal operating temperature of the engine, of course, depends on outside air temperature and the type of flying being done. In practice, the modified engine has been operated full power in low-level flight for extended periods of time with the outside air temperature approximately 100° F. and greater at altitudes varying 1500 and 2500 feet above sea level, without encountering any engine overheating, and without significant variance in the cylinder head temperature distribution.

Figure 7:
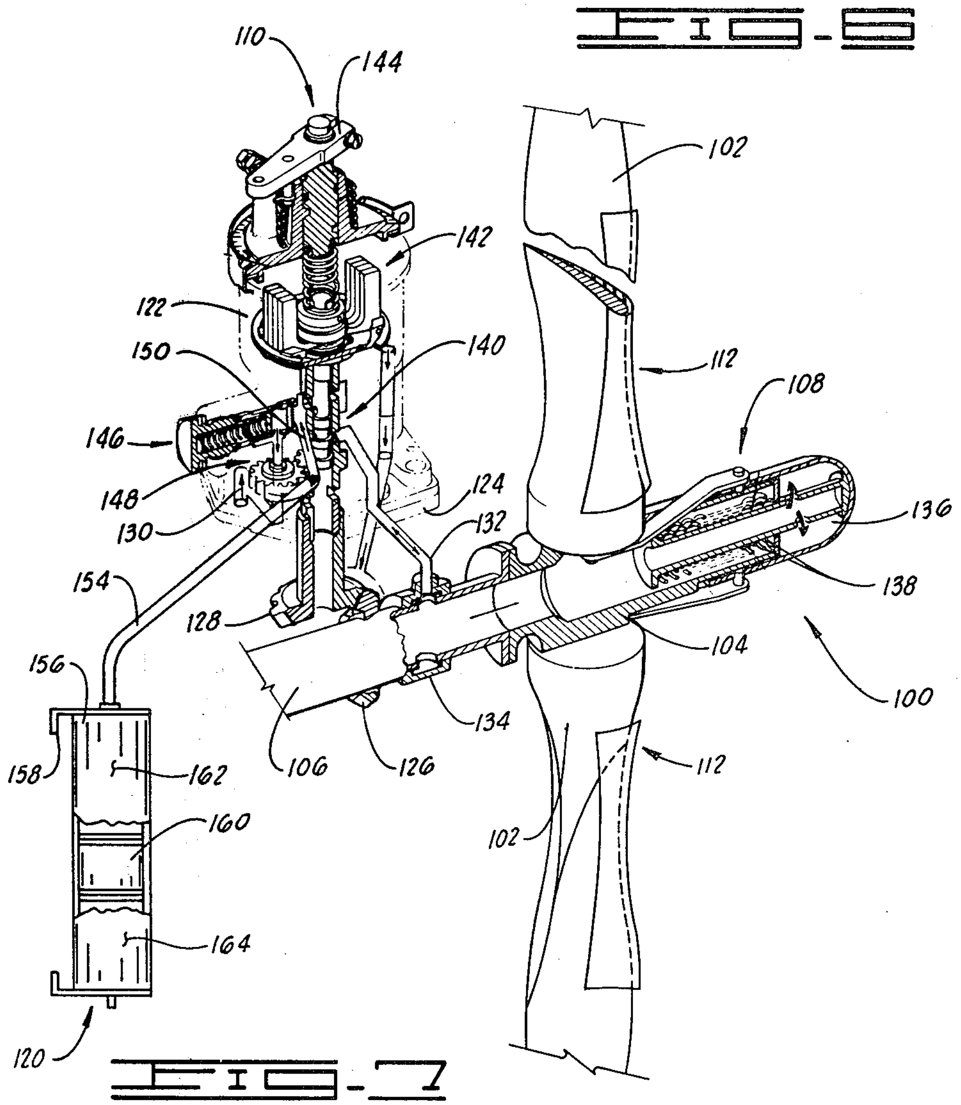
FIG. 7 is a perspective view of the propeller pitch control system including the governor pump, the propeller and propeller servo and a portion of the engine structure with portions of the pump, propeller servo and engine cut away for clarity.

Another portion of the dampening means of this invention is related to a propellor dampener apparatus which includes a dampener for the propeller blades of the engine. FIG. 7 shows in detail a two-bladed propeller assembly with dampeners thereon. The propeller assembly 100 which is normally used on the identified series of engines and on a great many other light aircraft-type engines. The propeller assembly 100 has a variable pitch propeller with a pair of blades 102 rotatably mounted on a hub 104 that is attached to the engine crankshaft 106. The propeller blades 102 are rotated about their longitudinal axis at the hub 104 by a hydraulically powered servo 108. An engine driven hydraulic pump 110 a governor pump is communicably connected with the servo 108 through the crankshaft 106 and used to control the pitch of the propeller blades 102. A pair of resilient propeller dampening members 112 are mounted on the forward side of the propeller blades 102 as shown. The propeller dampening members 112 are secured to the propeller blades 102 by a suitable adhesive or by other suitable means of attachment. In the propeller assembly 100 the servo 108 is connected by a linkage with the individual propeller blades 102 and changing the hydraulic fluid pressure in the propeller servo 108 changes the pitch of the blades 102 relatively to the plane of rotation of the propeller. Servo-controlled variable pitch propellers use hydraulic pressure from the engine driven pump to change the pitch of the blades by applying pressure to increase the pitch of the blades or applied pressure to decrease the pitch of the blades, depending upon the specific construction of the system. The propeller assembly 100 shown in FIG. 7 is the type of system wherein fluid pressure in the servo 108 is increased to increase the propeller blade pitch.

It has been found that vibration inducing forces are transmitted from the piston and cylinder assembly and governor pump to the propeller through the engine crankshaft. These forces transmitted to the propeller through the crankshaft are dependent upon the speed of the engine, and frequency of hydraulic fluid pressure pulses from the propeller and governor pump. Forces are also induced in the propeller by what is normally called "P-factor." The P-factor forces induced on the propeller are present when the aircraft is making a climbing turn. These forces are caused by the difference in the angle of attack of the propeller blades as they move from one side of the engine to the other and are subjected to differential loading. The P-factor induced vibrational forces are transmitted from the propeller to the engine through the crankshaft. The P-factor forces are believed to be a significant factor in causing engine failures during a climbing turn, particularly a climb from low altitude such as a takeoff, where relatively high power is being developed by the engine. When a propeller blade is on the side of its swing, having the highest angle of attack, it produces a greater force on the engine crankshaft than it does when it is on the opposite side where the angle of attack is less. This variation in force is transmitted directly to the engine crankshaft at a frequency dependent on the rotating speed of the crankshaft and number of propeller blades. P-factor vibrating induced forces are particularly acute when using a three-bladed propeller or a single-bladed propeller, as the forces on opposed sides of the aircraft are extreme. When using a two-bladed propeller the P-factor-induced forces are less extreme than with a one- or three-bladed propeller because of the balancing effect of the second blade being directly opposite to the crankshaft. Obviously, the natural frequency and frequency response of a propeller depends upon many factors such as its resiliency, moment of inertia, etc. In practice, it has been found that a metal propeller will readily transmit vibrational forces from its tips to the crankcase, and through the entire engine, with absence of any other forces.

The propeller dampener portion of the engine dampener structure of this invention includes a pair of resilient members 112 mounted on the interior portions of the propeller, as shown in FIG. 7. Preferably, the resilient members 112 are constructed of a resilient material having high dampening properties, such as neoprene, which can be attached to the propeller blades by a suitable adhesive. In practice, neoprene composition electric de-icing boots have been applied to a variable pitch servo-controlled propeller on the above-identified series of engines, and operated for a considerable time. In this practice, the propeller dampeners have been found to, in combination with the other elements of this invention, substantially dampen the vibrational forces and vibrations of the engine. Preferably, the resilient propeller dampeners are applied to the propeller and cover approximately 30 to 40 percent of the propeller's radius, originating at a point adjacent to the propeller hub. In practice, the propeller dampener members 112 were applied over approximately 33 percent of the propeller's blade span originating at a point close to the propeller hub. Although the propeller dampeners are shown and described as mounted on a variable pitch servo controlled two-bladed propeller, it is to be understood that such can be applied to other propellers such as fixed pitch propellers and nonservo-controlled variable pitch propellers to achieve a similar result.

Another portion of the dampening means of this invention is related to a hydraulic dampener for the governor pump of the propeller pitch changing apparatus. In FIG. 7, the propeller assembly 100 is shown with the governor pump 110 and with the hydraulic dampener apparatus indicated generally at 120. The function of the hydraulic dampener is to dampen the pulsations and the hydraulic fluid discharged from the governor pump and to prevent these pulsations from being transferred to the other engine components into the propeller. The governor pump 110, shown in FIG. 7 is typical of governor pumps used in light aircraft in that it has a housing 122, which is secured to a mount 124 on the crankcase of the aircraft engine. The governor pump 110 is driven from the engine crankshaft 106 by a pair of gears 126 and 128 as shown. Engine oil is supplied to the governor pump 110 through an inlet indicated at 130 and discharged through an outlet conduit 132 into a transfer gland 134 on the engine crankshaft 106. The end portion of the engine crankshaft 106 is hollow to allow oil to pass to and from the propeller servo 108. In the propeller servo 108, oil pressure on the piston 136 moves the piston against the force of return springs 138 which in turn moves the linkage connected with the propeller blades 102. The oil flow in the outlet conduit 132 is controlled by a pilot valve indicated generally at 140 so that oil can flow into and out of the propeller servo 108 as required. A speed-adjusting apparatus on the upper portion of the governor pump 110 has a flyweight assembly 142 and a speed adjusting lever 144 to control motion of the pilot valve 140 and thus control the oil flow in the outlet conduit 132. The actual pump portion of the governor pump 110 is a gear type pump assembly 148. A pressure relief valve assembly 146 is connected with the outlet of the gear pump assembly 148 in the lower portion of the governor pump housing 122. The gear pump 148 is driven directly from the engine crankshaft by gears 126 and 128, as shown. High pressure oil flow from the gear pump 148 to relief valve 146 is through a conduit indicated at 150. The relief valve assembly 146 has a return to the gear pump 148 and an outlet to the pilot valve assembly 140. The gear pump assembly 148 is by its basic nature a pump which will provide a substantially high-pressure output flow with pulsations in the output flow because of the geared construction. These pulsations in the output from the gear pump assembly 148 provide a substantial source of vibration which is transmitted to the engine through the governor pump housing 122 to the pump mount 124 on the engine crankcase, and through the oil supply to the propeller assembly 100.

The hydraulic dampener apparatus 120 is connected with the outlet of the gear pump assembly 148, to dampen the pulsations in its output oil flow. A conduit 154 is connected with the conduit 150 that joins the outlet of the gear pump assembly 148 to the inlet of the relief valve assembly 146 for connecting the hydraulic dampening device. In practice, a hydraulic accumulator has been used successfully as a hydraulic dampening device as shown in FIG. 7. In such practice, the accumulator housing 156 is provided with brackets for mounting it on the aircraft structure, with the conduit 154 being a high-pressure flexible hose. The hydraulic accumulator has a piston 160 mounted in the housing 156 between an oil chamber 162 and an air chamber 164. The piston 160 is freely movable within the housing and it is provided with sealing rings to keep the oil and air separated. Air under pressure is maintained in the air chamber 164 in order to maintain the piston 160 in a balanced condition against the oil in the oil chamber 162. During operation of the engine, the pulsations from the gear pump 148 cause the oil in the oil chamber 162 to pulsate thereby oscillating the piston slightly against the force of the air in the air chamber 164, thus dampening the pulsations in the oil flow as it is received by the relief valve assembly 146 and in turn as it is received by the pilot valve 140 and propeller assembly 100. The overall result of adding the hydraulic dampener in the form of the hydraulic accumulator is to dampen the pulsations in the oil flow as it passes through the crankshaft 106 and further into the propeller servo 108.

In practice, in experimenting to determine the significance of the effects of the hydraulic dampener for the governor pump, a governor pump crankshaft and propeller assembly were mounted on the crankcase of an IO-470 series engine and operated by an auxiliary power source. In the identified series of engines the governor pump operates at the crankshaft speed of the engine and it has a twelve (12) tooth gear in the gear pump assembly. At an engine speed of 2200 rpm, the pulsations of the oil flow from the governor pump have a frequency of 440 cps which is observed to be the same as the first harmonic of the engines cylinders. Upon changing the pitch of the propeller blades with the governor pump operating at 2200 rpm the second, third, and fourth harmonics of 440 cps were detected in the propeller blades with the fourth harmonic of 1760 cps being the most pronounced. In the cooling fins of a cylinder mounted on the engine crankcase substantial vibration was noted with the intensity thereof reaching approximately 140 db. Cycling of the governor pump 110 to vary the pitch of the propeller blades was found to transfer a substantial vibration to the propeller blades through the engine crankshaft as the governor pump was operated at speeds comparable to cruise and takeoff conditions. With the hydraulic dampener apparatus 120 connected in the fluid circuit as shown in FIG. 7, the pronounced vibrational transfer which was noted previously it was observed to be markedly decreased. It is to be noted that a hydraulic dampener other than a hydraulic accumulator can be used as this portion of the dampener means of this invention without departing from the scope of the invention. One example of a suitable equivalent hydraulic accumulator is a bladder-type reservoir with a resilient bladder operating to dampen the pulsations in the oil flow.

EXAMPLES

The following is a summary of results and observations made during practice of this invention on use with two separate Cessna 210 model aircraft, one of which was equipped with an IO-470 series Continental engine, and the other equipped with an IO-520 series engine. The engines of both aircraft were modified, then operated for specified periods of time. The IO-520 was torn down for inspection. The Cessna 210 is a lightweight high wing monoplane having a retractable landing gear. Both of the engins involved in these tests were originally of standard manufacture equipped with standard fuel injection systems and two bladed variable pitch propellers.

EXAMPLE I

In practice a Cessna 210 aircraft, having a remanufactured IO-470 series engine, has been operated with the fin dampeners, the tuned intake manifold, the propeller pitch control system having the hydraulic dampener and propeller with the dampener members thereon. This engine was operated for approximately four hundred (400) hours, engine time, after being remanufactured to the manufacturer's suggested specifications and before being modified as described above. During operation of this aircraft, several observations were made regarding its vibrational characteristics. First, the overall sound level due to vibration in the cabin of the aircraft was significantly lower for both takeoff and cruise conditions than it was prior to modification of the engine. Second, the cooling fins on the engine vibrated considerably less than before. It was observed that one could place their hand on the cooling fins of a cylinder and feel only a slight fin movement, whereas with the unmodified engine a substantial fin movement or vibration was felt when the cooling fins were touched. Third, the operating sound level of the engine outside of the cabin of the aircraft was noted to be substantially less. Typically, the identified series of engines have a recognizable sound in the form of an engine noise or crack that can be heard as the aircraft flies low overhead. This noise has a cracking sound of approximately 8 cps which can be easily heard and readily detected by an observer on the ground as an aircraft having such an engine is flown low overhead. With the engine modified as described, this characteristic observable noise is not present. Fourth, a decrease in fuel and oil consumption has been noted. During operation of this aircraft, it was engaged in private utility flying, and it was observed that the oil consumption dropped from one quart per three hours to one quart per six hours.

EXAMPLE II

In practice, a new Cessna 210 model aircraft, having a 75 hour IO-520 series engine was tested with the engine dampener structure of this invention. It is to be noted that the engine was purposely equipped with the lightweight cylinders in place of the normally equipped heavyweight cylinders. The engine was fitted with the fin dampeners, the hydraulic dampener and the propeller was fitted with the resilient members. During operation of this aircraft, it was flown considerably at 75 percent power and an engine speed of 2,480 RPM. In the operation of this aircraft, the four (4) observations enumerated above in Example I were each confirmed. During operation, it was observed that fuel consumption was approximately 13.3 gallons per hour and oil consumption was 7.1 hours per quart at approximately 75 percent power and 190 mph ias. During normal operation of an aircraft of this type operating in the same area in similar type flights with unmodified engines, it was observed that such aircraft normally have a fuel consumption of approximately 17 to 20 gallons per hour at approximately 75 percent power and 180 mph ias.

It is to be noted that the suggested overhaul time for this engine is 1200 hours, engine time. After operating this engine for 2,271 hours (more than 1,000 hours over the suggested overhaul time) the engine was dismantled for inspection. It is to be noted that during operation of the engine, only routine maintenance, oil changes every 400 hours and tuneups were performed. At the time the engine was dismantled, the compression was found to be 79/80, which is to be compared with 80/80 for a new engine, and 60/80 as the minimum usable compression rating. Inspection of the bearings indicated that all the bearings of the engine were in tolerance, with the maximum wear of 0.00301 in the two forwardmost main bearings on the crankshaft where 0.005 is the service limit. Inspection of the pistons revealed they were all within tolerance and were reusable. X-ray photographs of the crankshaft assembly, the piston assemblies, and the cylinders indicated that no cracks were present. Inspection of the piston rings indicated an essentially uniform wear pattern and particularly did not exhibit any wear pattern that could be attributed to the multinode vibrations described above. The engine was reassembled with new piston rings and returned to use. To date this engine has run approximately 4,000 hours (total engine time) without a single cylinder failure on the above described light weight cylinders and the compression is holding at 79/80 with the same low oil consumption of one quart per seven hours.

In the manufacture of the engine dampener means of this invention including the several structures thereof, it is obvious that it can be easily constructed to achieve the end product. The mechanical apparatus of the invention can be constructed by the same technique currently used in manufacturing parts for aircraft engines. The method of dampening the engine can be accomplished as described with the described apparatus or with suitable equivalent apparatuses or materials.

In the use and operation of the engine dampener means of this invention, it has been seen through the example that the engine dampener apparatus does operate as described, and it has a substantial effect on the operation of internal combustion reciprocating air-cooled aircraft engines to extend the useful life thereof and to increase the safety thereof. In carrying out the method of dampening the engine of this invention, it is seen that same can be accomplished easily and with significant useful results.

As will become apparent from the foregoing description of the engine dampener means, relatively simple and inexpensive apparatus has been provided to dampen the vibrational characteristics of aircraft engine and the method of dampening the engine is also inexpensive and relatively easily accomplished. The engine dampener structure includes several elements which are easily attachable to or replaceable on an aircraft by an appropriately skilled mechanic to have the effect of improving the operation of the engine. The method of dampening the engine of this invention can be accomplished by a nominally skilled aircraft engine mechanic.

While the invention has been described in conjunction with preferred specific embodiments thereof, it will be understood that this description is intended to illustrate and not to limit the scope of the invention, which is described by the following claims:

I claim:

1. In a multi-cylinder air cooled airplane engine having cooling fins on the engine cylinders, a variable pitch propeller and a hydraulic system having a governor pump for controlling the blades of the variable pitch propeller, a gear pump assembly, a relief valve assembly, the improvement comprising:

(a) a cooling fin vibration dampener mounted on the outer edge portion of the cooling fins, said cooling fin vibration dampener is a resilient member having a comb-like structure, the teeth of the comb-like structure being inserted between the outer edge portion of the cooling fins, said teeth have a structure defined by tapered and generally pointed outer end portions such that when mounted between said cooling fins said teeth assume an essentially rounded shape;

(b) a propeller dampener mounted on the blades of the variable pitch propeller, said propeller dampener is a resilient member mounted on the leading edge portions of each blade of the variable pitch propeller;

(c) a hydraulic fluid dampener, said hydraulic dampener comprising an accumulator housing having an inlet and an outlet, the outlet end of said accumulator housing includes an oil chamber with oil, said oil chamber situated inside said accumulator housing, the inlet end of said accumulator housing comprises an air chamber positioned inside thereof, a movable piston situated inside said accumulator housing between said oil chamber and said air chamber, an interconnecting conduit that joins the outlet of said gear pump assembly to the inlet of said relief valve assembly, an oil conduit connected with said interconnecting conduit and to said outlet end of said accumulator housing, a pneumatic means in communication with said inlet and said air chamber to maintain said piston in balance against the oil in said oil chamber such that pulsations of said gear pump assembly during operation causes oil in said oil chamber to pulsate thereby oscillating the piston slightly against the force of the air in said air chamber to dampen the pulsations of the oil flow as it is received by the relief valve assembly;

(d) a tuned intake manifold dampener means comprising a looped conduit structure having an inlet in the rear of said engine and interconnecting the intake ports of the engine's cylinders such that all of said intake ports are in communication with each other, a flow balancing conduit interconnecting with said looped conduit such as said looped conduit and said flow balancing conduit define generally a closed loop, said flow balancing conduit being situated in the front of said engine, said intake manifold additionally includes a plurality of outlet portions in communication with the insides of each cylinder of said engine, each of said outlet portions having a varying cross-sectional area to regulate flow from said intake manifold and provide an essentially uniform manifold pressure at said cylinders.

2. The improvement as descirbed in claim 1 wherein said teeth are about 0.15 inches in thickness, about 0.25 inches in width, and are spaced about 0.05 inches apart.

3. A method of dampening vibrations in a multicylinder air cooled airplane engine having cooling fins on the engine cylinders, a variable pitch propeller and a hydraulic system having a governor pump for controlling the blades of the variable pitch propeller, a gear pump assembly, a relief valve assembly, an interconnecting conduit that joins the outlet of said gear pump assembly to the inlet of said relief valve assembly, the steps including:

(a) separating a pair of adjacent said cooling fins by inserting a wedge-like means between same;

(b) inserting a tooth of a resilient member having a comb-like structure between said pair of adjacent fins, said comb-like structure having a plurality of teeth, said teeth have a structure defined by tapered and generally pointed outer end portions such that when mounted between said cooling fins said teeth assume an essentially rounded shape;

(c) removing said wedge-like means to release said cooling fins to contact and compressibly retain said tooth therebetween;

(d) repeating steps (a)-(c) until all of said plurality of teeth have been retained by said cooling fins to mount said comb-like structure;

(e) securing a resilient propeller dampener to the blades of the variable pitch propeller;

(f) connecting an oil conduit from the oil chamber of an accumulator housing to said interconnecting conduit, said accumulator housing additionally comprising an air chamber and a movable piston situated between said air chamber and said oil chamber;

(g) positioning a pneumatic means in communication with said air chamber; and (h) maintaining said piston in balance against oil in said oil chamber such that pulsations of said gear pump assembly during operation causes oil in said oil chamber to pulsate thereby oscillating the piston slightly against the force of the air in said air chamber to dampen the pulsations of the oil flow as it is received by the relief valve assembly.

* * * * *